United States Patent

[11] 3,603,769

| [72] | Inventor | Donald H. Malcolm<br>Minneapolis, Minn. |
|---|---|---|
| [21] | Appl. No. | 873,246 |
| [22] | Filed | Nov. 3, 1969 |
| [45] | Patented | Sept. 7, 1971 |
| [73] | Assignee | Bio Data, Inc.<br>Minneapolis, Minn. |

[54] RATE DETECTING APPARATUS
3 Claims, 3 Drawing Figs.

[52] U.S. Cl. .................................................. 235/92 DP,
235/92 R, 235/92 FQ, 235/92 EA, 235/92 EV,
346/74
[51] Int. Cl. .................................................. G06m 3/06
[50] Field of Search ........................................ 235/92, 65,
29 F, 54, 66; 346/74

[56] References Cited
UNITED STATES PATENTS

| 2,891,722 | 6/1959 | Nuttall et al. ................. | 235/92 |
| 2,948,469 | 8/1960 | Phillips et al. ................. | 235/92 |

*Primary Examiner*—Daryl W. Cook
*Assistant Examiner*—Joseph M. Thesz, Jr.
*Attorney*—Reif and Gregory

ABSTRACT: An apparatus giving a precise numerical count of the rate of occurrence of a series of discrete events electrically detected such as of a human pulse rate embodying the use of a counter giving a numerical readout of said rate of occurrence for a fixed interval of time directly preceding the count given.

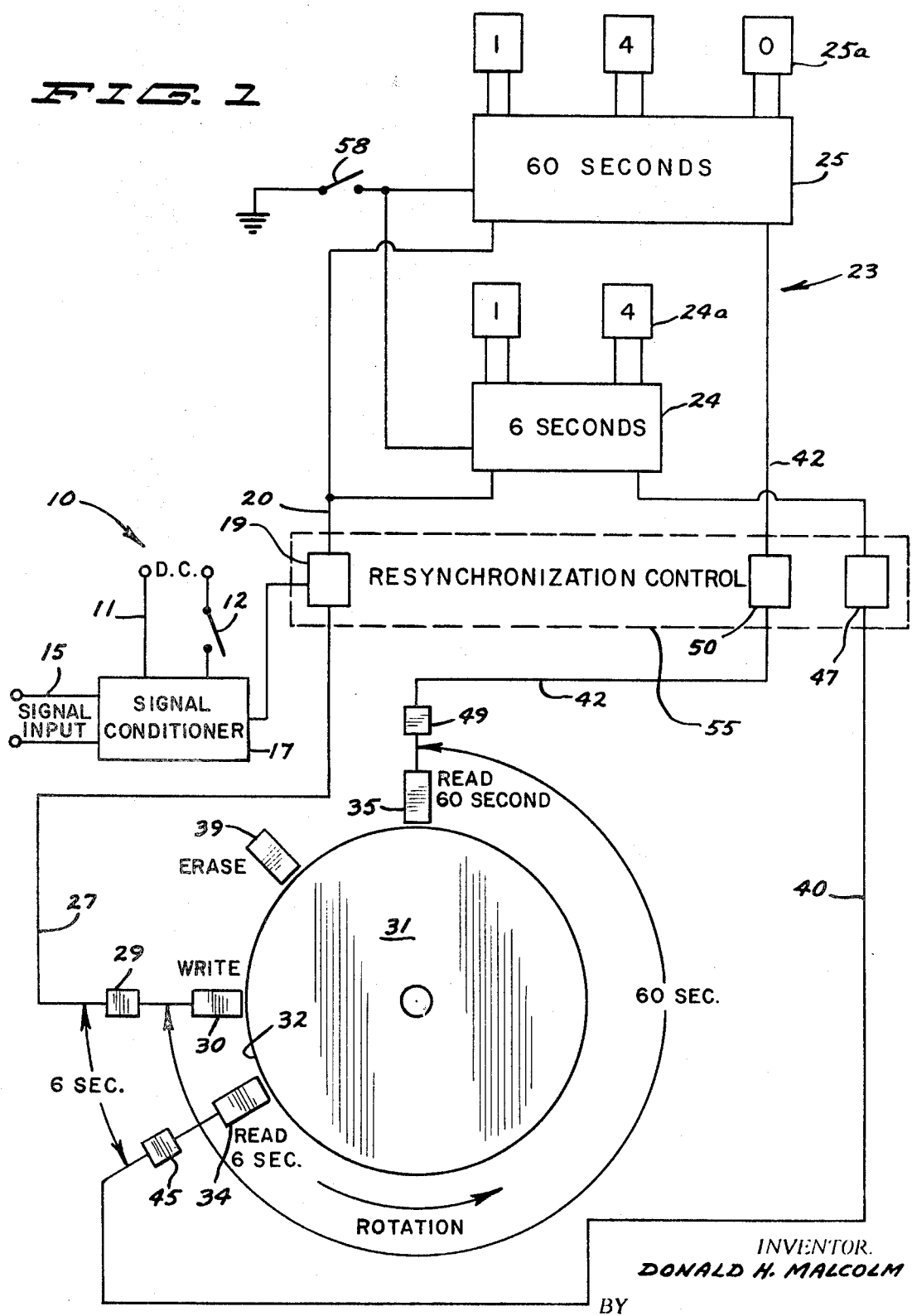

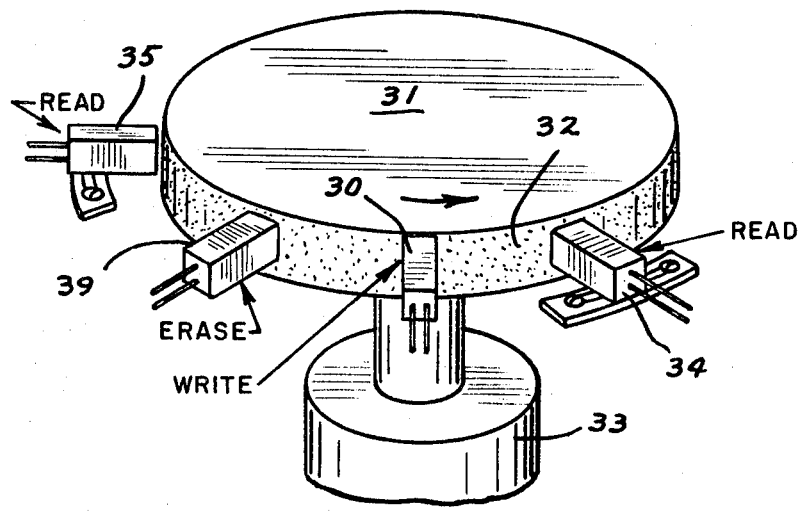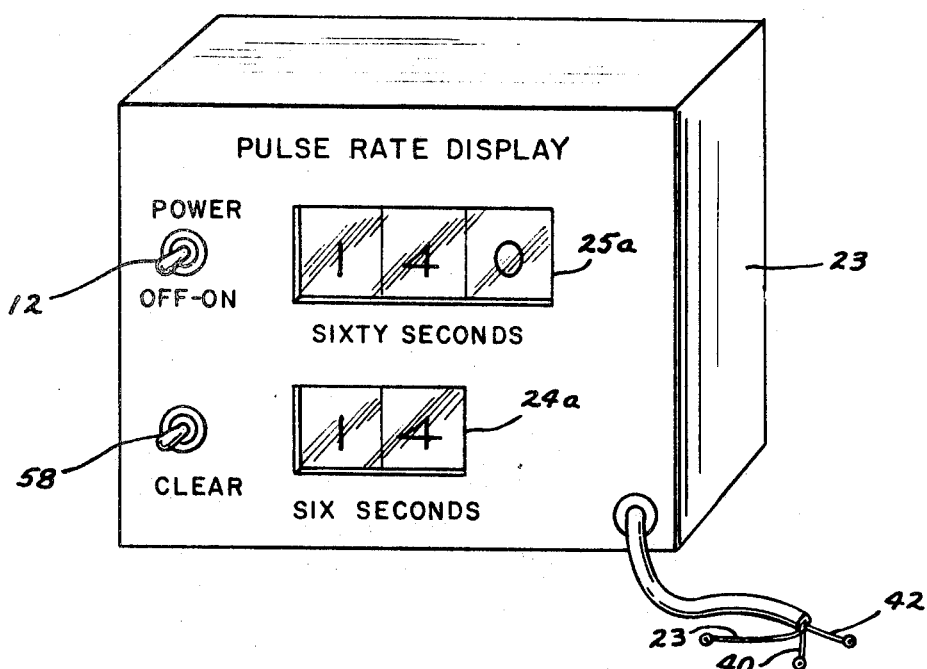

3,603,769

RATE DETECTING APPARATUS

BACKGROUND AND SUMMARY OF THE INVENTION

Many physical effects manifest as a relatively constant series of discrete events. The invention herein relates to an apparatus receiving and disclosing on a continuous basis the rate of occurrence of such events for given periods of time.

An example of the manifestation of such events is the human pulse rate.

Presently used apparatus for monitoring a pulse rate involves the receiving of signals derived from the pulse, converting these signals to a standardized electrical form, using the standardized signals to charge a capacitor and measuring the voltage across the capacitor with a meter calibrated into heart beats per minute.

This presently used apparatus possesses shortcomings in that it does not provide incremental information, it does not provide a numerical count, its response time is relatively slow and special ability is required to interpret a meter reading.

Generally stated, the invention herein which overcomes the above objections embodies the application of a digital apparatus which provides a precise numerical count of the discrete events occurring during an immediately preceding interval of time and makes an immediate disclosure of any numerical developments in the occurrence of said discrete events. The embodiment of the invention disclosed herein comprises as basic elements a standard binary coded decimal counter preferably with display units attached and a magnetic drum having a connection therewith a write head, erase head and a read head with an input conditioning circuit to properly shape the signal representing the pulse rate.

It is an object of this invention to provide an apparatus giving a numerical reading of the rate of occurrence of discrete events.

It is another object of this invention to provide an apparatus giving a simultaneous numerical reading of the rate of occurrence of a common series of discrete events for different given periods of time.

It is also an object of this invention to provide the disclosure on a continuous basis of changes in the rate of occurrence of a series of discrete events.

More specifically it is an object of this invention to provide an apparatus giving a reading by numerical count of the rate of the incremental occurrence of a series of discrete events, said reading representing the increments of occurrence of said events for an immediately preceding period of time.

These and other objects and advantages of the invention will be set forth in the following description made in connection with the accompanying drawings in which like reference characters refer to similar parts throughout the several views and in which FIG. 1 is a diagrammatic showing of the apparatus herein;

FIG. 2 is a broken view in perspective showing a recording portion of the apparatus; and FIG. 3 is a view in perspective showing a counting portion of the apparatus.

DESCRIPTION OF A PREFERRED EMBODIMENT

Digital computer technique applied to rate detection provides a display of a precise numerical count for the interval of time under consideration. The rate of occurrence of the event detected is taken of a given interval of time immediately preceding the display of the count. Disclosure is made immediately of any change in the rate of occurrence of said event.

Referring to the drawings, the apparatus shown diagrammatically in FIG. 1 is indicated generally by the reference numeral 10. It will be understood that conventional elements and circuits in combination are utilized to provide the apparatus disclosed herein.

The apparatus herein will be energized by DC current from a suitable source through lines 11 having an off-on switch 12 in connection therewith.

In the present embodiment, the pulse rate of a human being is the subject matter of interest. A pair of pickup leads 15 will be attached to the body of a person in a conventional manner. The pickup leads run to an input signal conditioner circuit 17 which will convert the pulse, hereinafter referred to as an input signal, to a logic level signal and will properly shape the signal for detection by the apparatus.

Said signal conditioner circuit 17 is in circuit with a resynchronization of resync circuit 19 which will be further described. A line 20 runs from said resync circuit to a counting means 23 shown here as a pair of binary coded decimal counters 24 and 25 respectively having display counters 24a and 25a respectively comprising two and three digit counters for purposes herein. Said counters 24 and 25 are in circuit in parallel arrangement. The input signal thus conducted to said counters is conducted to the countup sides of said counters.

The input signal is also conducted by a line 27 through a signal shaper and amplifier circuit 29 to a write head 30 for recording the input signal onto the magnetized recording edge surface 32 of a recording drum 31. Said drum is driven by a suitable motor 33 as indicated in FIG. 2, and for purposes herein said motor will be particularly adapted to rotate said drum at a speed of one revolution each 80 seconds.

In connection with said drum 31 is a first read head 34 and a second read head 35. Said first read head is spaced a 6 second interval of travel of said drum from said write head and said second read head is spaced a 60 second interval of travel from said write head. Positioned between said second read head and said write head in the direction of rotation of said drum is an erase head 39 which clears the recording surface of said drum of any signals.

Said write, read and erase heads will be energized from the power supply line 11 in a conventional manner.

A line 40 will run from said first read head 34 to the countdown side of said counter 24 and a line 42 will run from said second read head 35 to the countdown side of said counter 25. The read heads read the input signals recorded on the magnetized surface portion of said drum 31.

The input signal read from said drum 31 by the read head 34 is conducted by said line 40 through an amplifying circuit 45 and a resync circuit 47.

The input signal read from said drum 31 by said read head 35 is conducted by said line 42 through an amplifying circuit 49 and a resync circuit 50.

The resync circuits 19, 47 and 50 are inserted to synchronize the input signals going directly to said counters with the signals from the read heads to the counters whereby only one signal is received into a counter at one time whether it be a countup signal or a countdown signal. Said resync circuits are coordinated by a clocking circuit 55.

A clear switch 58 is carried by said counters 24 and 25 to clear the same of any count, as at the commencement of an operation.

OPERATION

In the application of the embodiment of the invention disclosed herein, a human pulse rate is detected and the numerical count thereof is displayed of the number of pulses detected over a 6 second interval and over a 60 second interval. In the event of a change in the rate it will be indicated first by the counter displaying the pulse rate over a 6 second interval.

A pulse is brought into the apparatus by the pickup leads 15 and is converted into a logic level signal by the signal conditioner circuit 17. This signal is properly synchronized by the resync circuit 19 in connection with the resync clock circuit 55.

The input signals direct from the pickup leads 19 each incrementally add one to each counter. These are countup signals. These will continue to add up on the counters. At the end of the first 6 second interval, the counter 24 will display a 6 second pulse rate. At the end of the first 60 second interval the counter 25 will display a 60 second pulse rate.

As the input signals are conducted to the counters, they are also conducted to the drum head 31 for recording thereon through the write head 30. The first pulse recorded on the drum 31 is read by the read head 34 at the end of the first 6 second interval and the signal thus read is conducted to the counter 34 to countdown. The synchronization clock circuit through which all signals pass to reach the counters permits the passage of only one signal at a time to reach each counter. It will be seen that if the rate of the pulse detected accelerates that the input or countup signals received by the counters will exceed the countdown signals received from the read heads and thus an increase in rate will be displayed by the counters so long as the increased rate of occurrence continues. In like manner a decrease in the rate of the pulse will be detected.

The counters 24 and 25 are in parallel circuit arrangement and operate simultaneously with the one giving a rate measured over a longer period of time than the other. Thus for example, with a patient undergoing surgery, the surgeons in attendance will be able to note a change in the pulse rate of the patient within a 6 second period of time and this would be quickly computed mentally into the rate for the customary 60 second interval of time.

When an operation of the apparatus herein is commenced, the clear switch 58 of the counters is actuated to clear the counters of recorded signals and one revolution of said drum past the erase head will clear the drum of all signals recorded thereon.

The pulse rate herein is taken merely as one form of a periodic event with respect to which it is desired to observe the rate of occurrence for a given interval of time. It will be understood that the apparatus herein may have other applications to detect rate of occurrence of discrete events for selected intervals of time within the scope of the invention.

I claim:

1. An apparatus detecting and recording the rate of occurrence of a series of discrete events, having in combination, means electrically detecting the occurrence of said discrete events, means converting said detected occurrence of said events into logic level signals, counting means, means conducting said signals to said counting means to actuate said counting means to incrementally count up said signals, a recording means, means incrementally writing said signals onto said recording means, means incrementally reading out said signals from said recording means, said writing and said reading means being arranged and positioned with respect to said recording means to provide a desired time space interval therebetween, means conducting said readout signals to said counting means to actuate the same to incrementally count down the numerical value of signals carried by said counting means, a second counting means in parallel relationship to said first mentioned counting means, said first mentioned conducting means conducting said signals to said second counting means to incrementally count up said signals, a second means incrementally reading out said signals from said recording means, said second reading means being arranged and positioned relative with respect to said recording means and in relation to said writing means to readout signals from said recording means at a different desired time space interval than the time space interval of reading out by said first mentioned reading means, and means conducting said signal from said second reading means to said second counting means to actuate the same to incrementally countdown from the numerical value of signals carried by said second counting means.

2. The structure set forth in claim 1 including means synchronizing sequentially said signals from said converting means to said first mentioned and second counting means respectively with said signals from said first mentioned and second reading means.

3. An apparatus detecting and recording the rate of occurrence of a series of discrete events, having in combination, means electrically detecting the occurrence of said discrete events, means converting said detected occurrence of said events into logic level signals, counting means, means conducting said signals to said counting means to actuate said counting means to incrementally countup said signals, a recording means, means incrementally writing said signals onto said recording means, means incrementally reading out said signals from said recording means, said writing and said reading means being arranged and positioned with respect to said recording means to provide a desired time space interval therebetween, means conducting said readout signals to said counting means to actuate the same to incrementally countdown the numerical value of signals carried by said counting means, whereby the numerical values of signals carried by said counting means indicates the rate of occurrence of said detected discrete events for said desired time space interval.